United States Patent [19]
Ruff

[11] 3,826,534
[45] July 30, 1974

[54] DUMP BODY FOR PICK-UP TRUCK

[76] Inventor: Gotfried G. Ruff, P.O. Box 57, Wilseyville, Calif. 95257

[22] Filed: May 9, 1973

[21] Appl. No.: 358,658

[52] U.S. Cl. .............................. 298/1 A, 298/19 V
[51] Int. Cl. ............................................... B60p 1/00
[58] Field of Search ................ 298/1 A, 19 R, 19 V

[56] References Cited
UNITED STATES PATENTS
1,341,142  5/1920  Lilly .................................. 298/19 V
3,411,825  11/1968  Fulton .............................. 298/1 A

*Primary Examiner*—Allen N. Knowles
*Attorney, Agent, or Firm*—William R. Piper

[57] ABSTRACT

A dump body for a pick-up truck in which the dump body is placed within a truck body and has its rear end pivotally mounted adjacent to the rear end of the truck body. A pair of rear posts are mounted on the sides of the truck body and a pair of front posts are also removably secured to the truck body sides. Pulleys are mounted at the tops of the rear posts and a cable mechanism has a cable extending from a winch on the truck body to a pulley on a front post and then the cable extends to a top pulley on a rear post and from there the cable is passed through two pulleys mounted at the two front corners of the dump body. The cable then extends to the top pulley of the other rear post and the end of the cable is secured to the other front post. This cable arrangement provides a compound lifting effect to the front of the dump body when the cable is wound upon the winch drum. The dump body has a spreader gate and a pair of laterally swingable half covers normally close the top of the dump body.

5 Claims, 6 Drawing Figures 3,826,534

DUMP BODY FOR PICK-UP TRUCK

BACKGROUND OF THE INVENTION

1. Field of the Invention

It is desirable to use a pick-up truck body as a dump body and it is also desirable to protect the bottom and side walls of the truck body from damage when using the dump body. To this end the size of the dump body is made large enough to be received in the truck body and the sides of the dump body have their upper portions flared outwardly so as to extend slightly beyond the upper edges of the sides of the truck body in order to prevent any material from falling into the space between the side wall of the truck body and the adjacent wall of the dump body.

It is also desirable to provide a cover for the dump body. I provide a cover consisting of two halves that extend throughout the length of the dump body and have their outer side edges hingedly secured to the adjacent side wall of the dump body and along juncture lines where the outwardly flared upper portions meet the dump body side walls. The two halves of the cover can serve the additional function of permitting the dump body to carry a larger load when the two cover halves are in open position and contact the front and rear pairs of posts for holding the cover halves in an upwardly and outwardly inclined position.

A compound lifting force for raising the dump body into an upwardly inclined position is effected when the cable from the winch is passed around a pulley attached to one of the front posts and then is passed around a pulley mounted at the top of a rear post and is also passed around two pulleys placed at the front two corners of the dump body and is finally passed around a pulley at the top of the other rear post and has its free end attached to the other front post. This makes it easy for an operator to turn the crank of the winch to lift the front of the dump body to tilt it into an inclined position. The winch could be operated by an electric motor whose source of electricity could be taken from the battery of the pick-up truck.

2. Description of the Prior Art

The patent to Charles N. Teetor, U.S. Pat. No. 2,033,209, issued Mar. 10, 1936, is for a dumping vehicle. In this patent the dumping unit is placed in the track body and L-shaped frame members have portions extending under the dumping unit and along the length thereof and have their front portions extending upwardly and provided with pulleys at their tops. A pinion and gear operate a windless that has a pair of spiral windings around which a pair of cables are wound. The free ends of these cables are passed over the two pulleys and then are attached to the front of the dumping unit body. A rotation of the pinion will cause the spiral windings to wind up the two cables and lift the front end of the dump body for dumping purposes. The rear end of the dump body is pivotally connected to the portions of the L-shaped frame members that underlie the dump body.

The patented dumping vehicle depends on a direct substantially vertical lift for the cables to raise the front end of the dump body. In my device, the cable is passed around several pulleys and two of these are mounted at the tops of the two rear posts and the cable extends from these two top pulleys to two other pulleys, one being mounted at each front corner of the dump body. This arrangement of the pulleys and cable results in a compound lifting force being exerted on the front end of the dump body for raising it into an inclined position when the cable is wound onto the winch. Other points of difference between my invention and the patented device will be set forth as further description of my device is set forth.

DESCRIPTION OF THE PREFERRED EMBODIMENT

Figure 5:
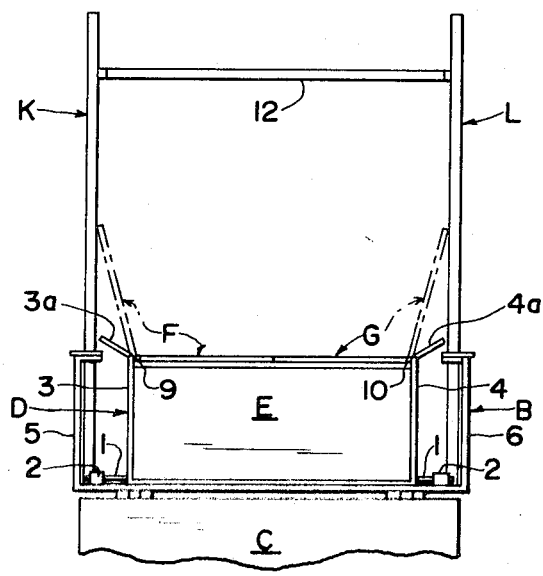
FIG. 5 is a rear elevation of the pick-up truck and the dump body. The tail gate of the pick-up truck is shown in open position and the dump body is shown in normal position with its spreader gate in closed position.
Figure 6:
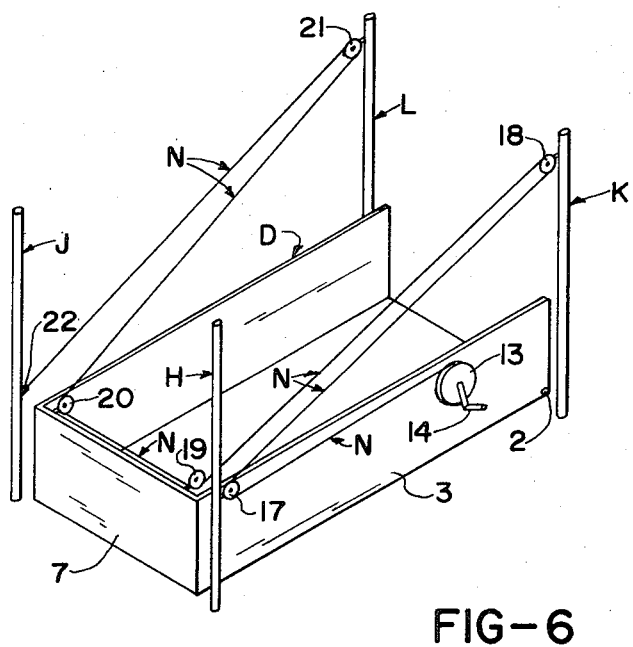
FIG. 6 is a schematic isometric view of the dump body and the cable and pulley mechanism that is used for tilting the dump body into a dumping position. The outwardly flared upper side wall portions of the dump body are not shown in this Figure. Also, the pick-up truck is not shown and the covers and spreader gate for the dump body are not shown.

In carrying out my invention, I make use of a pick-up truck that is indicated by the dot-dash lines at A in FIGS. 1 to 4 inclusive. The pick-up truck has a truck body B and a tail gate C. I mount a dump body D in the truck body B, see FIGS. 4, 5 and 6, and the rear edge of the dump body is pivotally secured to the truck body by a shaft 1 and bearings 2. It is obvious that the rear edge of the dump body may be pivotally secured to the truck body in any manner desired. The side walls 3 and 4 of the dump body D have a height substantially the same as the height of the side walls 5 and 6 of the truck body B, and the upper portions 3a and 4a of the dump body side walls 3 and 4, respectively, are flared outwardly as shown in FIG. 5, so as to project over the upper edges of the truck body side walls 5 and 6. In this way the flared out portions 3a and 4a prevent any material from dropping into the spaces between the dump side walls 3 and 4 and the adjacent truck side walls 5 and 6, respectively. FIG. 6 does not show the outwardly flared portions 3a and 4a of the dump body side walls 3 and 4. The dump body has a front wall 7 and a bottom 8, see FIGS. 2 and 4. A spreader gate E is hinged at the back of the dump body D and this gate cooperates with the tail gate C when both are in open position and the dump body is in a dumping position for controlling the flow of material as it leaves the dump body. Chains, not shown, are used for holding the tail gate C at the desired angle when the tail gate is in open position.

Figure 1:
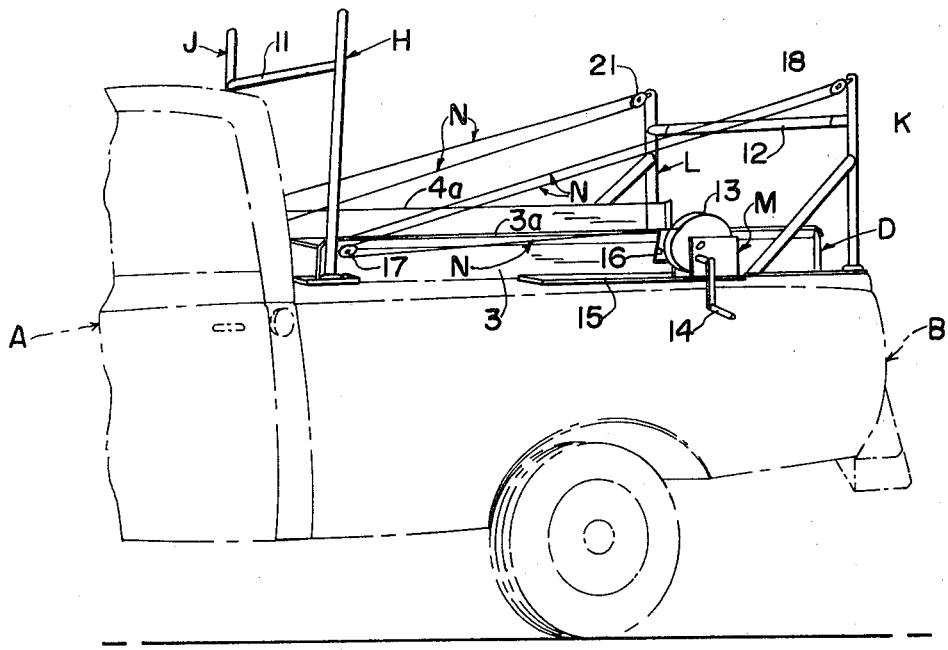
FIG. 1 is a perspective view of my dump body mounted in a pick-up truck, the latter being shown by dot-dash lines.
Figure 2:
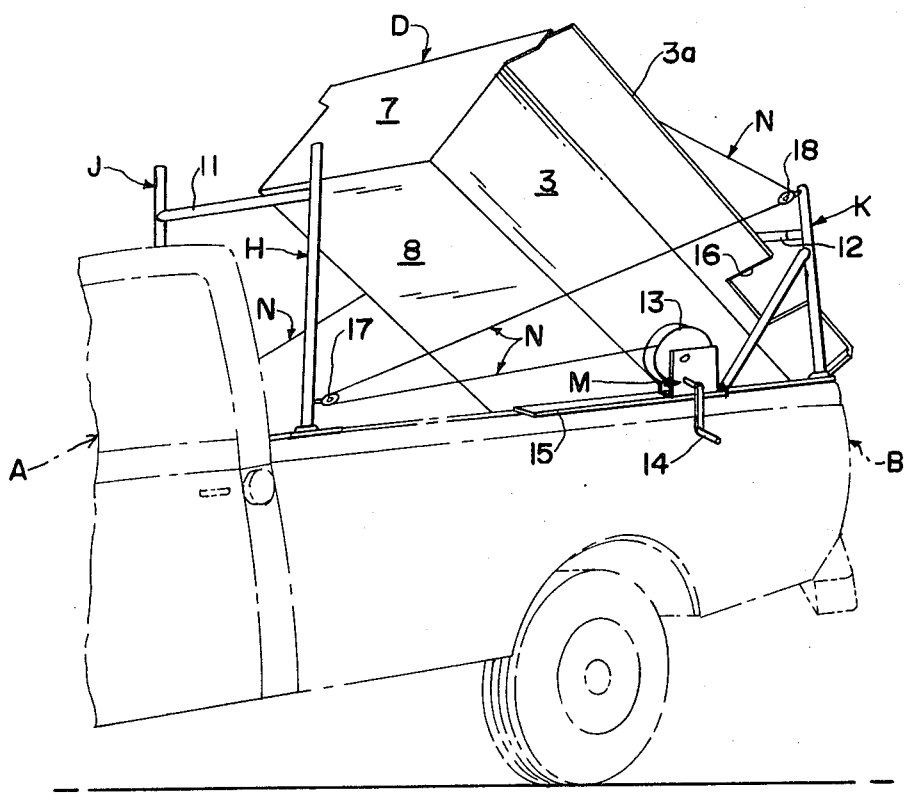
FIG. 2 is similar to FIG. 1 excepting that the dump body is shown in an upwardly inclined dumping position.
Figure 3:
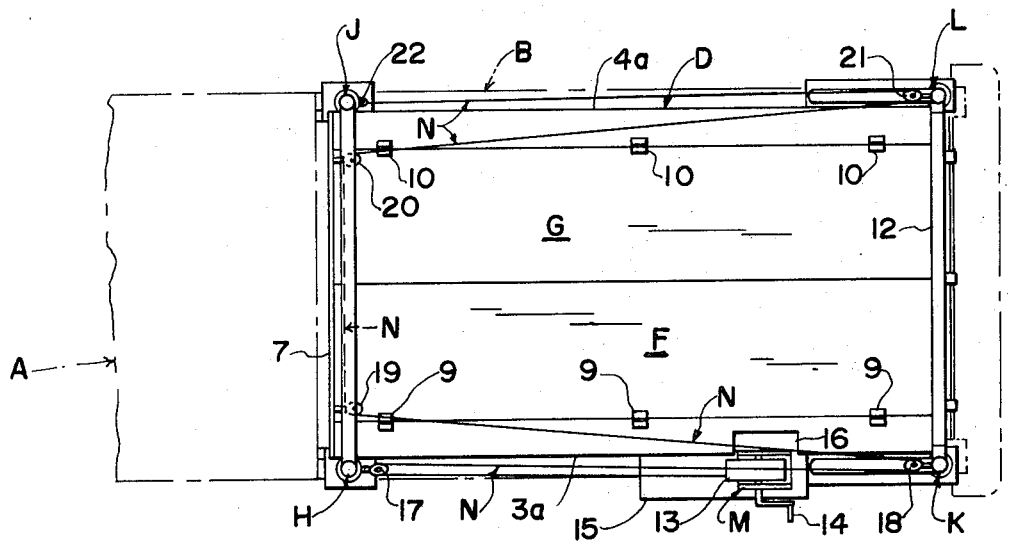
FIG. 3 is a top plan view of FIG. 1 and illustrates the two halves of the dump body cover in closed position.

I provide a cover for the dump body D and this cover is divided into two elongated halves F and G, see FIGS. 3 and 5. The cover half F has its outer edge pivotally secured to the dump body side wall 3 by hinges 9 and the cover half G has its outer edge pivotally secured to the other side wall 4 by hinges 10. When the cover halves F and G are in open position, see the dot-dash lines in FIG. 5, they will permit a greater load to be carried by the dump body D because the upwardly extending cover halves will constitute extensions for the dump body side walls 3 and 4.

I will now describe the novel cable mechanism for raising the dump body D into a dumping position. A pair of front posts H and J, see FIGS. 1 to 4 inclusive and FIG. 6, are removably mounted at the two front corners of the truck body B and are supported by the side walls 5 and 6 of the truck body. A cross member 11 extends between the front posts H and J, and acts as a bracing member between the two. A pair of rear posts K and L are removably mounted at the rear ends of the truck body side walls 5 and 6, respectively. A cross member 12 is removably mounted between the rear posts K and L, and constitutes a bracing member.

In FIGS. 1 to 4 inclusive I show a winch, indicated generally at M and the drum 13 on the winch is rotated by means of a crank 14. It is possible to have the drum rotated by a motor, not shown, and this motor would get its power from the truck battery, not shown. The winch is mounted on a base 15 which in turn is mounted on the upper edge of the truck body side wall 5. FIGS. 1 to 4 inclusive show the outwardly flared upper side wall portions 3a provided with a recess 16 that will receive the winch M when the dump body D is in normal position. The winch is not shown in FIG. 5 and only the drum 13 is schematically shown in FIG. 6.

A dump body lifting cable N has one end wrapped around the winch drum 13 and then this cable extends forwardly of the truck body and is passed around a pulley 17 that is mounted at the lower end of the front post H, see FIGS. 1-4 and 6. From here the cable extends rearwardly and is passed around a pulley 18 which is mounted near the upper end of the rear post K. Then the cable extends forwardly and downwardly and is passed around a pulley 19 that is mounted in the front left hand corner of the dump body D, see especially the schematic showing of the cable mechanism in FIG. 6 and also FIG. 3. The cable N then extends across the front of the dump body and adjacent to its front wall 7 and is passed around a pulley 20 which is mounted at the front right corner of the dump body. From here the cable N extends rearwardly and is passed around a pulley 21 that is mounted near the upper end of the other rear post L. Then the free end of the cable extends from the pulley 21 and is anchored at 22 to the other front post J, at a point that lies in substantially the same horizontal plane as the pulley 17.

OPERATION

From the foregoing description of the various parts of the device, the operation thereof will be readily understood. FIGS. 3 and 5 illustrate the dump body D in normal position in the truck body B and the two half covers F and G are closed and the spreader gate is also closed. The cover halves are swung into open position when the dump body is to be loaded with material. The dot-dash line positions of the opened cover halves shows them with their upper edges leaning against rear posts K and L, in FIG. 5. The lengths of the two half covers F and G are long enough that they will have the front portions of the outer cover edges leaning against the front posts H and J.

The dump body D may now be loaded with any desired material after which the pick-up truck may be driven to the place where the material is to be dumped. The operator now opens the truck tail gate C to the desired extent and secures the gate in adjusted position by the chains, not shown. The crank handle 14 is now actuated for rotating the drum 13 of the winch M or the motor, not shown, which is connected to the battery, not shown, for rotating the drum. The cable N is wound upon the drum and since it is passed around five pulleys 17 to 21, inclusive, a compound lifting force on the front end of the dump body D will be effected and will raise the dump body into a dumping position as shown by the dot-dash lines in FIG. 4. If the load is not too large and does not extend above the flared side walls 3 and 4 of the dump body, the two cover halves F and G could have been removed. Should the cover halves be in open position during the dumping operation, the operator would remove the cross bracing member 12 from between the rear posts K and L so that there would be no interference with the open cover halves.

One vital point of novelty in my invention is that in addition to the compound lifting effect on the dump body D applied by passing the cable N through a number of pulleys, there is a compound lifting effect produced by the two lengths of cable extending downwardly from the top rear pulley 18 on the rear post K, to the two lower pulleys 17 and 19, and by the two lengths of cable extending downwardly from the top rear pulley 21 on the other rear post L to the other lower pulley 20 and the cable anchor 22. A tremendous lifting force on the front end of the dump body is effected when the crank handle 14 is operated or the drum 13 is rotated by a motor, not shown.

Figure 4:
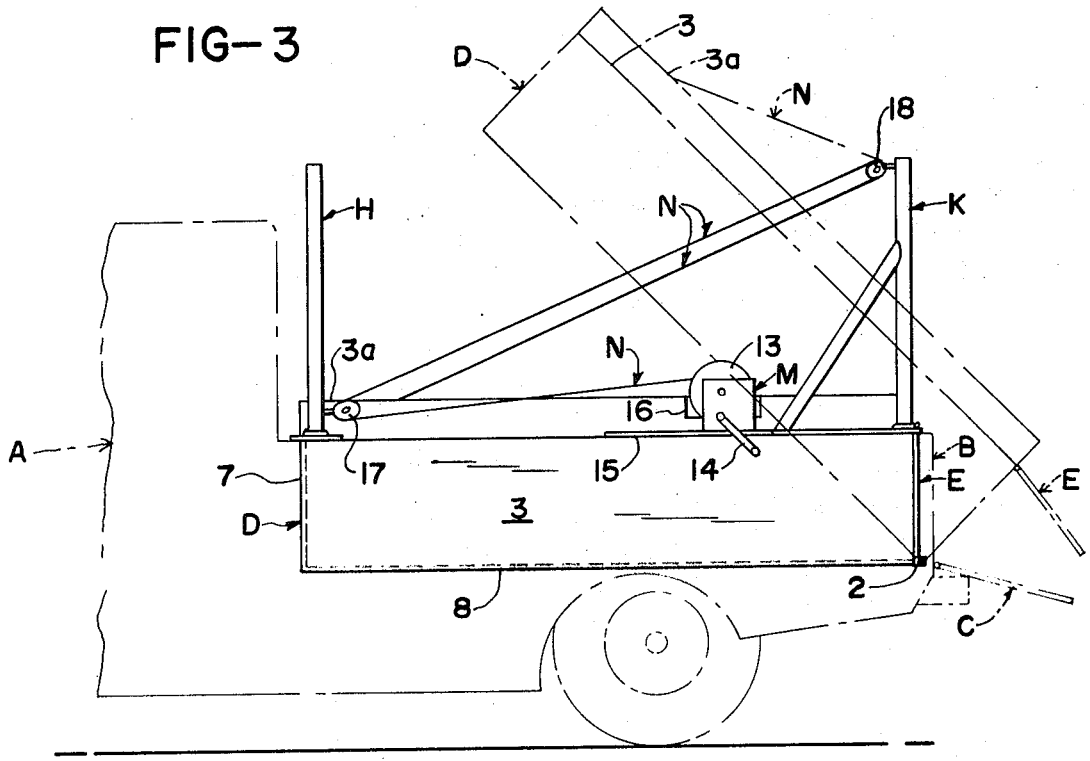
FIG. 4 is a side elevation of the dump body in normal position and shows the dump body in raised position by dot-dash lines. The pick-up truck is also shown by dot-dash lines.

FIG. 4 illustrates how the spreader gate E can swing open as the material in the dump body D flows out through the rear end of the body and under the spreader gate by gravity as the dump body is tilted into dumping position. The pick-up truck can be moved during the dumping operation if it is desired to spread the material over the ground at a certain depth during the dumping operation.

I claim:

1. A dump body for a pick-up truck comprising:
   a. a pair of rear posts positioned near the rear ends of the two sides of the pick-up truck body and extending above the truck body sides;
   b. a pair of front posts positioned near the front of the two sides of the pick-up truck body;
   c. a dump body having a size substantially filling the interior of the truck body and having a bottom wall with its rear edge pivotally secured to the truck body;
   d. a winch mounted on the truck body and having a cable passed around a first pulley mounted on a front post on the same side of the truck body as the winch, said cable then being passed around a second pulley mounted near the top of a rear post disposed on the same side of the truck body and then being passed around a third pulley mounted at the front of the dump body and adjacent to the dump body side wall that is disposed near to the truck body side wall supporting the winch; said cable then being passed around a forth pulley mounted at the front of the dump body and near to the other dump body side wall and then being passed around a fifth pulley mounted near the top of the other rear post; said cable having its free end secured to the other front post; and e. means for actuating the winch for causing the cable to swing the dump body into a dumping position.

2. The combination as set forth in claim 1: and in which a. the side walls of the dump body have outwardly flared upper portions that project over the adjacent side walls of the truck body.

3. The combination as set forth in claim 1: and in which a. said dump body has a cover consisting of two half sections with their outer edges hingedly secured to the adjacent walls of the dump body.

4. The combination as set forth in claim 1: and in which a. said dump body has a spreader gate hingedly secured at its upper edge to the rear ends of the dump body side walls.

5. The combination as set forth in claim 3: and in which a. said dump body has a spreader gate hingedly secured at its upper edge to the rear ends of the dump body side walls.

* * * * *